(12) United States Patent
Jacobsson

(10) Patent No.: US 8,021,014 B2
(45) Date of Patent: Sep. 20, 2011

(54) FLOOR LIGHT

(75) Inventor: Jan Jacobsson, Forslov (SE)

(73) Assignee: Valinge Innovation AB, Viken (SE)

( * ) Notice: Subject to any disclaimer, the term of this patent is extended or adjusted under 35 U.S.C. 154(b) by 496 days.

(21) Appl. No.: 11/635,631

(22) Filed: Dec. 8, 2006

(65) Prior Publication Data

US 2007/0159814 A1     Jul. 12, 2007

Related U.S. Application Data

(60) Provisional application No. 60/757,892, filed on Jan. 11, 2006.

(30) Foreign Application Priority Data

Jan. 10, 2006  (SE) ...................... 0600034

(51) Int. Cl.
    *F21V 21/02*         (2006.01)
(52) U.S. Cl. ...................... 362/153; 362/330
(58) Field of Classification Search .............. 362/153, 362/559, 330, 364
    See application file for complete search history.

(56) References Cited

U.S. PATENT DOCUMENTS

| | | | |
|---|---|---|---|
| 312,269 A * | 2/1885 | Higley | 362/153 |
| 1,813,492 A | 7/1931 | Goodloe | |
| 2,565,251 A | 8/1951 | Malmstrom | |
| 3,562,076 A * | 2/1971 | Lea | 428/325 |
| 3,993,813 A * | 11/1976 | Grieco et al. | 428/38 |
| 4,303,969 A * | 12/1981 | Hamilton et al. | 362/153 |
| 4,340,929 A * | 7/1982 | Konikoff et al. | 362/153 |
| 4,544,993 A | 10/1985 | Kirk | |
| 4,737,764 A | 4/1988 | Harrison | |
| 4,969,068 A | 11/1990 | Williams | |
| 5,095,412 A | 3/1992 | French | |
| 5,219,629 A * | 6/1993 | Sobolev | 428/35.9 |
| 6,231,206 B1 | 5/2001 | Hervey | |
| 6,755,561 B2 * | 6/2004 | Kluser | 362/551 |
| 7,021,786 B1 * | 4/2006 | Sandor, Sr. | 362/153 |
| 7,097,913 B2 | 8/2006 | Yuzawa | |
| 2004/0211143 A1 | 10/2004 | Hannig | |
| 2004/0222609 A1 | 11/2004 | Schmitt | |
| 2008/0005981 A1 | 1/2008 | Jacobsson | |

FOREIGN PATENT DOCUMENTS

| | | |
|---|---|---|
| DE | 198 11 076 A1 | 9/1999 |
| DE | 200 04 992 U1 | 7/2001 |
| DE | 203 03 610 U1 | 8/2004 |
| EP | 1 308 577 A2 | 5/2003 |
| EP | 1 425 990 A1 | 6/2004 |
| EP | 1 469 141 A1 | 10/2004 |
| EP | 1 469 141 B1 | 4/2006 |

(Continued)

OTHER PUBLICATIONS

Official Action dated Jun. 12, 2009 in copending U.S. Appl. No. 11/822,708.

(Continued)

*Primary Examiner* — Sharon E Payne

(74) *Attorney, Agent, or Firm* — Buchanan Ingersoll & Rooney PC

(57) ABSTRACT

The present invention relates to a floor panel and a flooring with a preferably continuous and unbroken front face, which is at least partially light transmitting and which has a light pattern/sign at the front face.

44 Claims, 4 Drawing Sheets

FOREIGN PATENT DOCUMENTS

| | | | |
|---|---|---|---|
| GB | 2 376 287 | A | 12/2002 |
| GB | 2 380 539 | A | 4/2003 |
| WO | WO 94/26999 | A1 | 11/1994 |
| WO | WO 00/20705 | A1 | 4/2000 |
| WO | WO 03/087498 | A1 | 10/2003 |

OTHER PUBLICATIONS

Official Action dated Aug. 8, 2008 in copending U.S. Appl. No. 11/822,708.

Official Action issued in U.S. Appl. No. 11/822,708, Dec. 21, 2009.

* cited by examiner

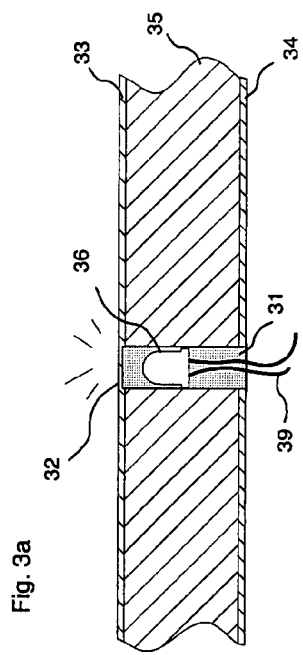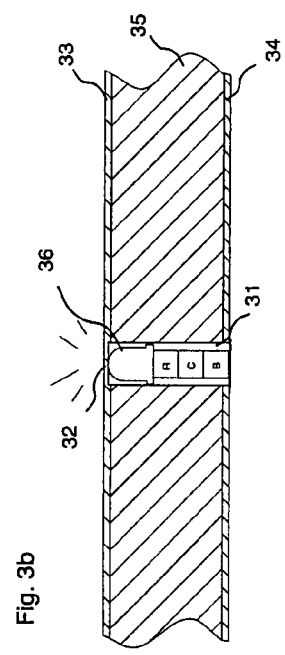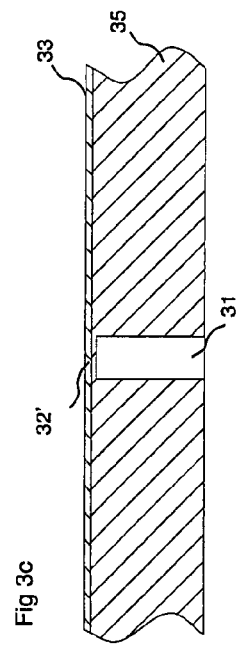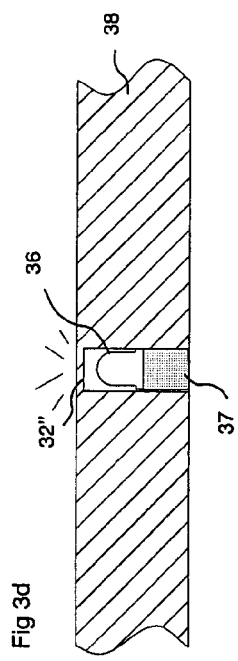

FLOOR LIGHT

BENEFIT

The present application claims the benefit of U.S. Provisional Application No. 60/757,892, filed in the United States on Jan. 11, 2006, the entire contents of which are hereby incorporated herein by reference.

TECHNICAL FIELD

Embodiments of the present invention relate to a flooring and a floor panel with a continuous and unbroken front surface, which is at least partially light transmitting, providing for a light sign or pattern at the front face.

BACKGROUND

Embodiments of the invention may concern a laminate floor panel comprising a mechanical locking system, formed at least at two opposite edges and with a continuous and unbroken front surface, which is at least partially light transmitting. The following description of known techniques, problems of known systems and objects and features of embodiments of the invention will above all, as a non-restrictive example, be aimed as the field of the application. It should be emphasised that embodiments of the invention may be used in any floor panel and it could be combined with all types of known locking systems, for example, where the floor panels are intended to be joined using a mechanical locking system connecting the panels in the horizontal and vertical directions on at least two adjacent sides. Embodiments of the invention may also be applicable to, for example, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces such as stone, tile and similar may be included and floorings with soft wear layer, for example, needle felt glued to a board. The invention can also be used for building panels, which preferably contain a board material, for example, wall panels, ceilings, furniture components and similar.

It is known that an illuminated floor can be assembled of wooden panels comprising illumination devices mounted through holes of the wooden panels, for example, as described in U.S. Pat. No. 5,095,412.

It is also known that an illuminated floor can be achieved by panels of glass or plastic assembled above illumination devices, for example, as described in DE 200 04 992 U1.

The illuminated floor panels known up to now have several disadvantages. There are apertures and notches at the front surface, due to the broken surface, which collect dust and moisture, and which apertures also lower the impact strength and the wear resistance. Alternatively, the panels comprise a surface of plastic or glass, which is a poor material for a floor panel with low strength and wear resistance. The known floor panels are also not aesthetically pleasing since they do not look like a normal panel and therefore do not blend in to a normal floor. Another disadvantage is that the known panels are difficult to assemble and disassemble, which is of great importance for a floor panel with a lighting means, since the lighting device must be possible to repair or exchange.

OBJECTS AND SUMMARY

Embodiments of the present invention may include a floor panel or flooring with a light means, in particular a laminate floor panel, which provides for new embodiments according to different aspects offering respective advantages. A useful area for the floor panels are public flooring, e.g. in stores, restaurants, ships, hotels and airports, for information signs or decoration.

According to a first aspect, embodiments of the invention provides for a laminate floor panel, which is at least partly light transmitting, comprising a front face, a rear face, a surface layer of resin-impregnated sheets and a wood-based core. The light transmitting is preferably obtained by removing parts of the core or even parts of the surface layer to such an extent that a light source located under the floor surface is visible at the front face.

According to a preferred embodiment of this first aspect there is an aperture at the rear face of the floor panel and a transmitting layer between the bottom of the aperture and the front face. The aperture is preferably formed by mechanical working, e.g. drilling and chipping.

Laminate flooring usually comprises a core of a 6-9 mm fibreboard, a 0.2-0.8 mm thick upper decorative surface layer of laminate, preferably comprising sheet material impregnated with thermosetting resins and a 0.1-0.6 mm thick lower balancing layer of laminate, plastic, paper or like mate-vial. The surface layer provides appearance and durability to the floorboards; and preferably contains at least one layer imprinted with a pattern, for example a wood pattern printed on a paper layer. The core provides stability, and the balancing layer keeps the board plane when the relative humidity (RH) varies during the year. The floorboards are generally laid floating, i.e. without gluing, on an existing subfloor.

The front surface of the floor panel according to the first aspect of the invention may be a wear resistant material, covering any object under the panel, and is continuous and also a natural floor material. A first advantage is that there are no dust or moisture collecting apertures or notches at the front surface. A second advantage is that when the lighting means is turned of, the floor panel looks just like a normal floor. A third advantage is that the floor panel has a high wear and impact resistance.

Preferably, a mechanical locking system is formed at least at two opposite edges of the floor panel, which facilitates the joining of a similar floor panel or a normal floor panel, which is not partly light-transmitting. Mechanical locking system joined by angling are for instance known from WO 94/26999, which is especially advantageous at the long sides of a rectangular floor, and another locking system especially advantageous at the short sides, particularly when combined with an angling locking system like the one described in WO 94/26999, are described in PCT/SE2005/001586, owner Valinge Innovation AB. Other shapes of floor panels are also possible. One advantage in providing an illuminated floor panel with a mechanical locking system is that when you want or need to change an illuminated floor panel, due to failure of lighting means or a desire to have another light sign/symbol, it is simple to disassemble such floor panels and to change the illuminated panels. The above mentioned combination of locking systems make it possible to join floor panels by several methods, preferably with a single action method, where the long edge is installed with angling and the short edge, which is provided with a flexible tongue, with vertical folding. This combination is also very easy to disassemble. Other mechanical locking system are also known, and possible to use, which are joined by Angling-Angling, Angling-Snapping or Snapping-Snapping. Floor-boards with a mechanical locking system are generally laid floating, i.e. without gluing, on an existing subfloor.

Evidently it is also possible to use a tongue and a groove joint, usually combined with gluing or nailing or other fastening means.

According to an embodiment of the first aspect, the wood based core is made of MDF or HDF.

According to another embodiment, lighting means is mounted into the aperture. It is also possible to connect a conductor to the lighting means and in the same or another aperture a battery cell and/or a receiver and/or a control unit. The aperture is preferably filled with a filling material, preferably light transmitting.

The thickness of the transmitting layer is adapted to the power of the lighting means, with the aim of facilitating light to transmit through the transmitting layer. The transmitting layer preferably comprising substantially the surface layer or the surface layer and a part of the core under the surface layer.

According to a second aspect, embodiments of the invention provide for a floor panel comprising a light-transmitting core of plastic or glass and a surface layer of resin-impregnated sheets, which is also at least partly light transmitting. It is feasible to mount a light means under the floor panel, preferably in a subfloor or into an aperture. An advantage with this system is that it is easier to mount, connect and control the lighting means; the draw back is that the subfloor normally has to be worked or changed. It is also possible to combine a floor according to the first aspect with such a sub-floor comprising a lighting means, provided that if there is a filler, the filler is light transmitting.

According to a first embodiment of the second aspect, only a part is light transmitting. Before attaching the surface layer to the light-transmitting core the rear side of the surface layer is worked, chemically or mechanically, forming a thinner part with a light-transmitting layer. Preferably, the space between the transmitting layer and the core is filled with a light transmitting filler, e.g. resin. An advantage of this embodiment is that it is possible to create a light pattern with only one lighting means.

According to second embodiment of the second aspect, the whole surface layer is light transmitting and the light pattern at the front surface is formed by the lighting means solely. Another possibility is that there is a second layer between the surface layer and the core, which is partly light transmitting, or the attaching means has various light transmitting properties, forming the light pattern at the front surface.

In both embodiments the attaching means also is preferably light transmitting, at least at the transmitting layer. The thickness of the transmitting layer, respectively in the first embodiment and of the surface layer in the second embodiment, is adapted to the power of the lighting means, with the aim of facilitating light to transmit.

Preferably, a mechanical locking system is formed at the edges, alike as in the first aspect, resulting in the same advantages.

In the first and second aspect of the invention the resin impregnated sheets could be replaced with a wood veneer, preferably treated with oil or varnish.

According to a third aspect, embodiments of the invention provide for a floor panel comprising a solid wood body, an aperture at the rear face of the floor panel and a transmitting layer between the bottom of the aperture and the front face. The aperture is preferably formed by mechanical working, e.g. drilling and chipping and the front surface preferably treated with oil or varnish.

Preferably, a mechanical locking system is formed at the edges, alike as described in the first aspect, resulting in the same advantages.

According to another embodiment of the third aspect a lighting means is mounted into the aperture. It is also possible connect a conductor to the lighting means and in the same or another aperture a battery cell and/or a receiver and/or a control unit. The aperture is preferably filled with a filling material, preferably light transmitting. Another solution is to mount a light means under the floor panel, as described in the second aspect, resulting in the same advantages.

The thickness of the transmitting layer is adapted to the power of the lighting means, with the aim of facilitating light to transmit through the transmitting layer.

According to a second object, embodiments of the invention provide for a flooring comprising at least one of the floor panels above in the first object, joined to one or more similar floor panels or one or more normal floor panels, which are not partly light-transmitting.

Preferably the flooring is joined on a sub-floor comprising a lighting means mounted in e.g. an aperture or recess of the sub-floor.

A preferred lighting means is a light emitting diode, due to the low heat generation and small size.

In view of the above, an objective of embodiments of the invention is to solve or at least reduce the problems discussed above.

In particular, an objective of embodiments of this invention is to provide a floor panel with a light pattern/sign, which when an accompanying light means is turned off looks like a normal floor panel, and due to the front face of the floor panel being of a normal floor material the wear resistance is high. There are also no dust and moisture collecting apertures and recesses at the front face.

An advantage of forming a mechanical locking system at the edges of the floor panel is that it is easy to assemble and also disassemble and change the floor panel with the light pattern/sign.

All references to "a/an/the [element, device, component, means, step, etc]" are to be interpreted openly as referring to at least one instance of said element, device, component, means, step, etc., unless explicitly stated otherwise.

BRIEF DESCRIPTION OF DRAWINGS

FIGS. 3*a-d* show in cross-section different embodiments of the invention.

DETAILED DESCRIPTION OF PREFERRED EMBODIMENTS

Figure 1:
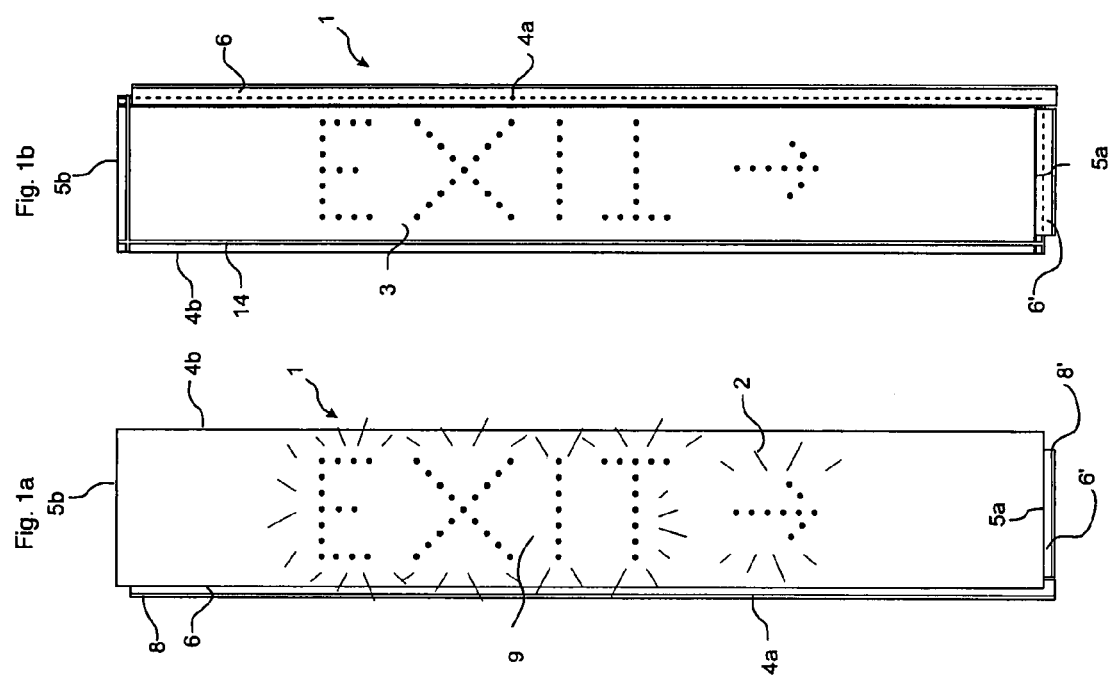
FIGS. 1 *a-b* are a schematic top plan view and a schematic bottom view respectively of a floor panel according to one embodiment of the invention.
Figure 2:
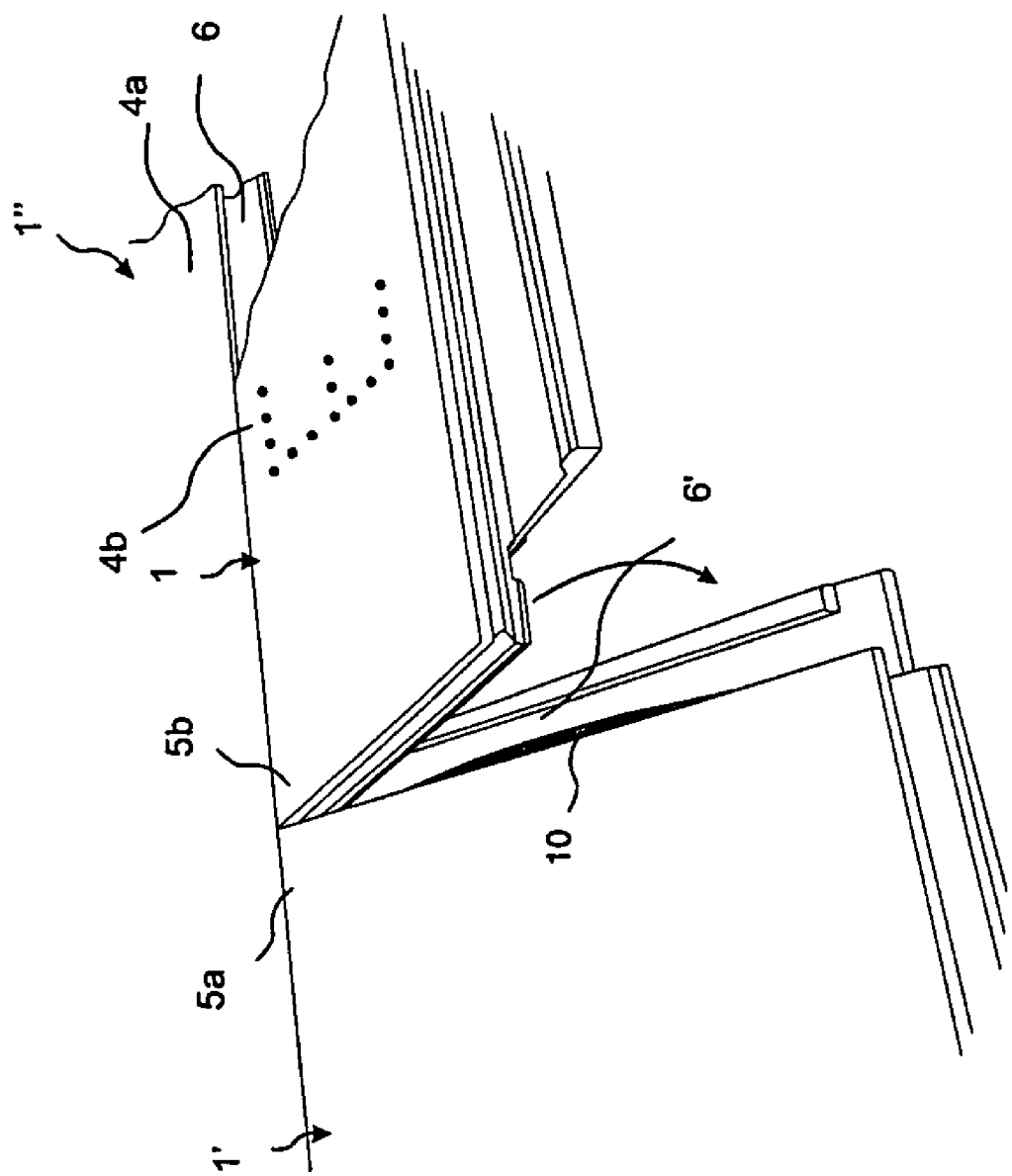
FIG. 2 shows a view whereby panels are joined by a single-action, angling at one edge and vertical folding at an adjacent edge.

As represented in FIGS. 1 and 2, embodiments of the invention relate to a floor panel and a flooring, provided with a light sign or pattern. The sign or pattern is preferably not visible when a related lighting means is turned off, and in that state the floor panel or the flooring looks just like a normal floor and all the features related to the lighting are covered. The lighting means is mounted in the floor panel or in a sub-floor.

According to a first aspect of the invention, a laminate floor panel 1, at least partly light transmitting, may comprise a front face 2 and a rear face 3 and a light sign or a decoration 9 is provided at the front face. The floor panel may further comprise, as shown in FIGS. 3a-c, surface layer 33 of resin impregnated sheets or a wood veneer, a wood based core 35, an aperture 31 at the rear-face of the floor panel and a transmitting layer between the bottom of the aperture and the front face. The thickness of the transmitting layer is adapted to the power of an accompanying lighting means 36, aiming at facilitating light to transmit through the transmitting layer. The sign or decoration 9 is preferably only visible when the related lighting means is turned on and the lighting means it self and the aperture is preferably never visible from the front face. In one alternative, the transmitting layer 32 only comprises the surface layer 33 and in a second alternative the transmitting layer 32' also comprises the core 35. The aperture 32 is at least partly preferably filled with a filler 37, preferably light transmitting.

Preferably a mechanical locking system 6, 6' is formed at least at two opposite edges 5a, 5b or 4a, 4b. The most preferred mechanical locking system comprising a flexible tongue, which results in a very simple assemble and disassemble operation, facilitating the change of the floor panel with the light sign. The floor panel 1 in FIG. 2 is joined along a first edge 5b to a second edge of an adjacent floor panel 1', with a mechanical locking system 6' comprising a flexible tongue 10, by vertical folding, and along a third edge 4b to the fourth edge 4a of another adjacent floor panel 1", with a mechanical locking system 6, by angling. The whole panel 1 is joined in a single action. Other known mechanical locking systems for floor panels are also possible to use.

One alternative is to attach the lighting means into the aperture and connect it with a conductor 39 and via the conductor control the lighting means by a control unit C. A battery cell B and a receiver R is also possible to connect via the conductor. A second alternative is to mount the lighting means and a battery cell in the same aperture, together with preferably a receiver R and a control unit C. The conductor is preferably attached into a recess of the floor panel and covered with a filler, e.g. resin. One example of a lighting means is a light emitting diode and another example is fibre optic. If fibre optic is used, the conductor is a fibre optic cable.

The wood-based core is preferably a particle, MDF or HDF board.

Figure 4A:
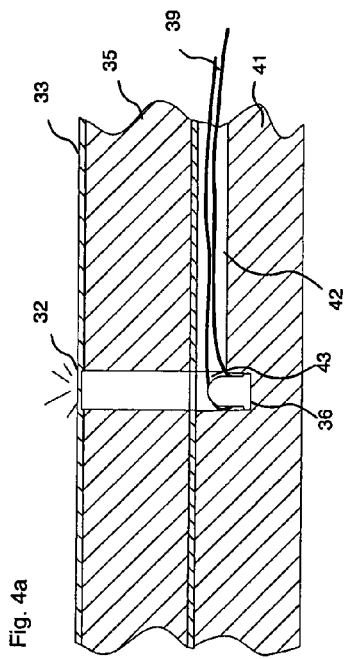
FIGS. 4*a-c* show in cross-section different embodiments of a floor panel mounted on a sub-floor with a lighting means.
Figure 4B:
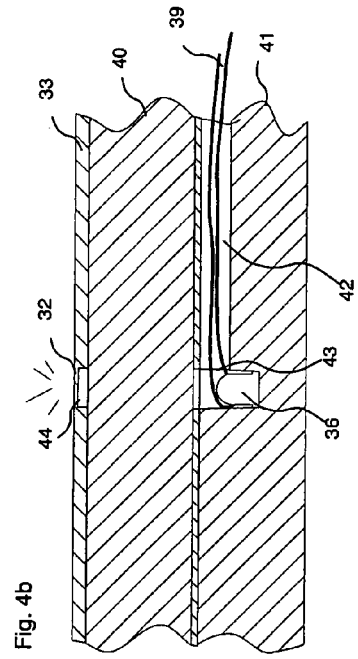
Figure 4C:
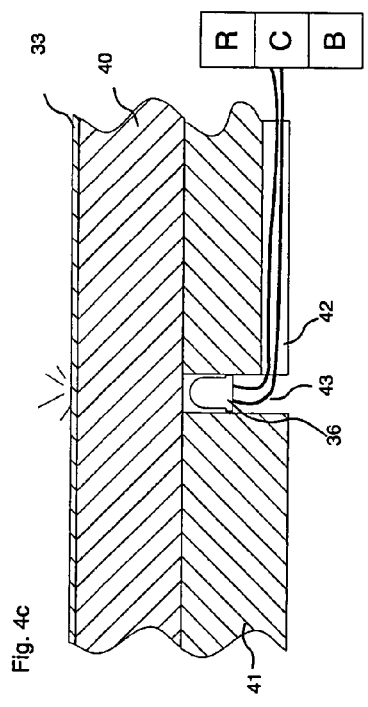

According to a second aspect of the invention, represented in FIGS. 4b-c, the floor panel comprising a core made of a light transmitting material 40, such as plastic or glass and a surface layer 33 of resin impregnated sheets or wood veneer, which are at least partly light transmitting. The floor panels are mounted on a sub-floor 41, comprising a lighting means 36, preferably a light emitting diode, mounted into an aperture 43 of the sub-floor. One alternative is to connect the lighting means with a conductor 39 mounted into a recess 42 of the subfloor and via the conductor control the lighting means by a control unit C. A battery cell B and a receiver R is also possible to connect via the conductor. A second alternative is to mount the lighting means and a battery cell in the same aperture, together with preferably a receiver R and a control unit C. Also the floor panel according to the second aspect is preferably joined by a mechanical locking system, alike as described above.

In one embodiment, see FIG. 4b, the surface layer has at least one area comprising a thinner and light transmitting layer, which is mechanically or chemically worked. A space 44 between the core 40 and the transmitting layer is preferably filled with a light transmitting filler.

In a second embodiment, see FIG. 4c, the whole surface layer 33 is light transmitting. The pattern or sign at the front face is in this embodiment formed by the formation of the lighting means 36. Is it also possible to form the light pattern or the sign at the front face by an additional layer between the surface layer and the core or by the attaching means used for attaching the surface layer to the core. The additional layer could be punched or could have a printed pattern, which is at least partly visible from the front face. In this case, the additional layer and the attaching means has light-transmitting properties, which varies over the front surface. The design of the whole floor panel could be changed if the surface is light transmitting. The appearance of several panels in a floor could for example be varied over time by changing the light intensity in individual floor panes. This will create a new design element which could be very attractive in for example show rooms, shops etc.

A third aspect of the invention, represented in FIG. 3d, is a partly light-transmitting floor panel, comprising a body 38 of solid wood, an aperture, a lighting means 36, and a transmitting layer 32" between the bottom of the aperture and the front face. The aperture is preferably, at least partly, filled with a filler. The features described above for the first aspect and related to the mechanical locking, the lighting means, the battery cell, the receiver and the control unit are applicable also to a floor panel according to the third aspect. FIG. 4a shows that it is also possible to mount a floor panel according to the first and third aspect on a sub-floor comprising a lighting means.

The thickness of the transmitting layer, described above in the different aspects of the invention, is preferably in the range of 0.05-1 mm and most preferably in the range of 0.3-0.7 mm. The thickness depends of the power of the lighting means and the light transmitting properties of the material, and to some extent also the strength of the material. Most materials suitable for flooring could be light transmitting if they are made thin enough. Stone, tiles and a lot of different plastic and wood based materials are possible to use. In metal surfaces for example micro openings which are not visible from the surface could be made and preferably filled with a light transmitting material A second object of embodiments of the invention is a flooring comprising at least one of the floor panels above, joined to one or more similar floor panels or one or more normal floor panels, which are not partly light-transmitting.

Embodiments of the invention have mainly been described above with reference to a few embodiments. However, as is readily appreciated by a person skilled in the art, other embodiments than the ones disclosed above are equally possible within the scope of the invention, as defined by the appended claims.

Generally, all terms used in the claims are to be interpreted according to their ordinary meaning in the technical field, unless explicitly defined otherwise herein.

The invention claimed is:

1. A floor panel comprising a front face and a rear face, the floor panel is at least partly light transmitting, the floor panel further comprising:
   a light transmitting part;
   an aperture extending through the rear face of the floor panel to a bottom and configured for receiving a light source therein;
   a surface layer of a resin impregnated laminate paper sheet or wood material defining the front face,
   wherein the front face is continuous and unbroken over the light transmitting part, such that the resin impregnated laminate paper sheet or wood material defining the front face is continuous and unbroken through the entire light transmitting part and is continuous and unbroken over and beyond the aperture, wherein a thickness of the light transmitting part is adapted to the power of the light source, facilitating an observable amount of light to transmit through the light transmitting part, wherein the light transmitting part is between the bottom of the aperture and the front face of the floor panel, wherein the light transmitting part is substantially only the resin impregnated laminate paper sheet or wood material.

2. The floor panel as claimed in claim 1, wherein the floor panel comprises a core of a wood-based material.

3. The floor panel as claimed in claim 2, wherein the core comprises HDF, MDF or particle board.

4. The floor panel as claimed in claim 2, wherein the continuous and unbroken surface layer is wood veneer.

5. The floor panel as claimed in claim 1, wherein the aperture comprises a light transmitting filler.

6. The floor panel as claimed in claim 1, wherein the floor panel comprises a light source in the aperture.

7. The floor panel as claimed in claim 6, wherein a conductor is connected to the light source.

8. The floor panel as claimed in claim 7, wherein the conductor is mounted into a recess, at the rear face of the floor panel.

9. The floor panel as claimed in claim 8, wherein the recess comprises filler.

10. The floor panel as claimed in claim 6, wherein a power source is mounted at the floor board and connected to the light source.

11. The floor panel as claimed in claim 6, wherein a control unit controls the light source, and wherein the control unit is mounted at the floor panel.

12. The floor panel as claimed in claim 6, wherein the light source is connected to a receiver mounted at the floor panel.

13. The floor panel as claimed in claim 6, wherein the light source is a light-emitting diode.

14. The floor panel as claimed in claim 6, wherein the aperture comprises a filler.

15. The floor panel as claimed in claim 1, wherein the light-transmitting part of the continuous and unbroken surface layer is thinner than a remainder of the surface layer.

16. The floor panel as claimed in claim 15, wherein the thinner and light-transmitting part is mechanically worked by cutting or grinding.

17. The floor panel as claimed in claim 15, wherein the floor panel comprises a light transmitting filler between the thinner and light-transmitting part of the surface layer and the core.

18. The floor panel as claimed in claim 1, wherein a mechanical locking system is formed at an edge of the floor panel.

19. The floor panel as claimed in claim 1, wherein an underlayer is attached to the rear face.

20. A flooring consisting of at least two floor panels according to the floor panel defined in claim 1.

21. The flooring as claimed in claim 20, wherein the flooring comprises a sub-floor.

22. The flooring as claimed in claim 21, wherein the sub-floor comprises a light source mounted into an aperture of the sub-floor.

23. The flooring as claimed in claim 22, wherein the light source comprises two or more lighting devices mounted into a recess.

24. The flooring as claimed in claim 20, wherein at least two floor panels are mechanically joined at adjacent edges.

25. The flooring as claimed in claim 20, wherein an underlay is attached to the floor panel and a hole in the underlay matches a light-transmitting part of the floor panel.

26. The floor panel as claimed in claim 1, wherein an outer perimeter of the floor panel is defined by a single unitary flooring element, said light transmitting part is integral with the floor panel within the outer perimeter, and the light source is removable therefrom.

27. The floor panel as claimed in claim 1, wherein the thickness of the light transmitting part is in the range of 0.05-1 mm.

28. The floor panel as claimed in claim 1, wherein the thickness of the light transmitting part in the range of 0.3-0.7 mm.

29. The floor panel as claimed in claim 2, wherein the continuous and unbroken surface layer is a resin impregnated laminate paper sheet.

30. A floor panel comprising a front face and a rear face, the floor panel is at least partly light transmitting, the floor panel further comprising:
    a light transmitting part;
    an aperture extending through the rear face of the floor panel to a bottom and configured for receiving a light source therein;
    a core of a wood-based material; and
    a separate surface layer of a resin impregnated laminate paper sheet or wood material defining the front face,
    wherein the front face is continuous and unbroken over the light transmitting part, such that the resin impregnated laminate paper sheet or wood material defining the front face is continuous and unbroken through the entire light transmitting part and is continuous and unbroken over and beyond the aperture,
    wherein a thickness of the light transmitting part is adapted to the power of the light source, facilitating an observable amount of light to transmit through the light transmitting part,
    wherein the resin impregnated laminate paper sheet or wood material is directly connected to the core.

31. The floor panel as claimed in claim 30, wherein the core comprises HDF, MDF or particle board.

32. The floor panel as claimed in claim 30, wherein the continuous and unbroken surface layer is wood veneer.

33. The floor panel as claimed in claim 30, wherein the continuous and unbroken surface layer is a resin impregnated laminate paper sheet.

34. The floor panel as claimed in claim 30, wherein the aperture comprises a light transmitting filler.

35. The floor panel as claimed in claim 30, wherein the floor panel comprises a light source in the aperture.

36. The floor panel as claimed in claim 30, wherein the light transmitting part is between the bottom of the aperture and the front face of the floor panel, and wherein the light transmitting part is substantially only the surface layer.

37. The floor panel as claimed in claim 30, wherein the light transmitting part is between the bottom of the aperture and the front face of the floor panel, and wherein the light transmitting part is substantially only the surface layer and the core.

38. The floor panel as claimed in claim 30, wherein the light-transmitting part of the continuous and unbroken surface layer is thinner than a remainder of the surface layer.

39. The floor panel as claimed in claim 30, wherein a mechanical locking system is formed at an edge of the floor panel.

40. The floor panel as claimed in claim 30, wherein an underlayer is attached to the rear face.

41. A floor panel comprising a front face and a rear face, the floor panel is at least partly light transmitting, wherein the floor panel is substantially of solid wood, the floor panel further comprising:

a light transmitting part of solid wood;

an aperture extending through the rear face of the floor panel to a bottom and configured for receiving a light source therein;

wherein the front face is solid wood and is continuous and unbroken through the entire light transmitting part and is continuous and unbroken over and beyond the aperture, wherein a thickness of the light transmitting part is adapted to the power of the light source, facilitating an observable amount of light to transmit through the light transmitting part.

42. The floor panel as claimed in claim 41, wherein the aperture comprises a light transmitting filler.

43. The floor panel as claimed in claim 41, wherein the floor panel comprises a light source in the aperture.

44. The floor panel as claimed in claim 41, wherein a mechanical locking system is formed at an edge of the floor panel.

* * * * *